(12) United States Patent
Garrett (10) Patent No.: US 7,849,595 B2
(45) Date of Patent: Dec. 14, 2010

(54) METHOD FOR REPAIRING AN IMPELLER (75) Inventor: Steven M. Garrett, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/694,751

(22) Filed: Jan. 27, 2010

(65) Prior Publication Data

US 2010/0126015 A1 May 27, 2010

Related U.S. Application Data (62) Division of application No. 12/275,859, filed on Nov. 21, 2008, now Pat. No. 7,690,094, which is a division of application No. 11/044,868, filed on Jan. 26, 2005, now Pat. No. 7,469,452.

(51) Int. Cl.
*B23P 6/00* (2006.01)
*B23K 31/00* (2006.01)

(52) U.S. Cl. ............... 29/889.1; 29/23.51; 29/464; 29/525.14; 29/559; 228/119; 269/287

(58) Field of Classification Search ............ 29/559, 29/525.14, 23.51, 464, 889.1, 889.2, 889.21, 29/889.22; 269/287, 268, 269, 270, 909; 228/44.3, 119
See application file for complete search history.

(56) References Cited

U.S. PATENT DOCUMENTS

| | | | |
|---|---|---|---|
| 3,673,659 A | 7/1972 | Ishii et al. | |
| 4,092,018 A | 5/1978 | Schlosser et al. | |
| 4,118,847 A | 10/1978 | Mansson et al. | |
| 4,509,238 A | 4/1985 | Lee et al. | |
| 4,575,911 A | 3/1986 | Laszlo | |
| 4,709,729 A | 12/1987 | Harrison | |
| 4,737,417 A | 4/1988 | Mushardt et al. | |
| 4,868,963 A | 9/1989 | Corsmeier et al. | |
| 5,020,716 A | 6/1991 | Miller et al. | |
| 5,191,711 A | 3/1993 | Vickers et al. | |
| 5,316,202 A | 5/1994 | Murray et al. | |
| 5,984,633 A | 11/1999 | Bachinger et al. | |
| 7,469,452 B2 * | 12/2008 | Garrett | 29/23.51 |
| 7,690,094 B2 * | 4/2010 | Garrett | 29/23.51 |

* cited by examiner

*Primary Examiner*—David P Bryant
*Assistant Examiner*—Sarang Afzali
(74) *Attorney, Agent, or Firm*—Ingrassia Fisher & Lorenz, P.C.

(57) ABSTRACT

The present invention provides a method of weld repairing an impeller by use of a weld restraining fixture. The fixture is used to sandwich the impeller between a base plate and a top ring such that a plurality of tangs located on the top ring rest on the plurality of valley faces of the impeller. The top ring and base plate are bolted together while the restrained impeller is welded and heat treated.

8 Claims, 7 Drawing Sheets

METHOD FOR REPAIRING AN IMPELLER

CROSS-REFERENCE TO RELATED APPLICATION

This application is a divisional of U.S. application Ser. No. 12/275,859, filed on Nov. 21, 2008, now U.S. Pat. No. 7,690,094; which is a divisional of U.S. application Ser. No. 11/044,868, filed on Jan. 26, 2005, now U.S. Pat. No. 7,469,452.

FIELD OF THE INVENTION

The present invention relates to welding repairs for impellers. More particularly the invention is related to a fixture used to maintain proper impeller geometry during welding and repair operations.

BACKGROUND OF THE INVENTION

Turbine engines are used as the primary power source for many types of aircrafts. The engines are also auxiliary power sources that drive air compressors, hydraulic pumps, and industrial gas turbine (IGT) power generation. Further, the power from turbine engines is used for stationary power supplies such as backup electrical generators for hospitals and the like.

Most turbine engines generally follow the same basic power generation procedure. Compressed air generated by axial and/or radial compressors is mixed with fuel and burned, and the expanding hot combustion gases are directed against stationary turbine vanes in the engine. The vanes turn the high velocity gas flow partially sideways to impinge on the turbine blades mounted on a rotatable turbine disk. The force of the impinging gas causes the turbine disk to spin at high speed. Jet propulsion engines use the power created by the rotating turbine disk to draw more air into the engine and the high velocity combustion gas is passed out of the gas turbine aft end to create forward thrust. Other engines use this power to turn one or more propellers, fans, electrical generators, or other devices.

Low and high pressure compressor (LPC/HPC) components such as compressor blades and impellers are primary components in the cold section for any turbine engine, and are typically well maintained. The LPC/HPC components may be subjected to stress loadings during turbine engine operation, and also may be impacted by foreign objects such as sand, dirt, and other such debris. The LPC/HPC components can degrade over time due to wear, erosion, foreign object damage, and other factors. Sometimes LPC/HPC components are degraded to a point at which they may need to be repaired or replaced, which can result in significant operating expense and time out of service.

There are several traditional methods for repairing damaged turbine engine components, and each method has some limitations in terms of success. One primary reason for the lack of success is that the materials used to make LPC/HPC components do not lend themselves to efficient repair techniques. For example, titanium alloys are commonly used to make impellers because the alloys are strong, light weight, and highly corrosion resistant. However, repairing an impeller with conventional welding techniques subjects the impeller to high temperatures both during the welding operation and during any pre- or post-welding heat treatment. This high temperature has resulted in warpage to impeller structures.

Nevertheless, there is a continuing need for improved repair methods that allow quicker repairs that minimize the need to scrap expensive parts. The modern jet aircraft is a very high capital thing. Gas turbine engines, for example, include many expensive components with complex shapes; impellers are one example of such a component. The complex design, and expensive materials, that are used to fabricate impellers often means that they can be quite expensive. As a consequence of these design and material criteria, it is desirable to repair damaged impellers when possible. The geometry of turbine engine impellers makes them particularly vulnerable to heat-related warping. The challenge is to heat the part to the temperatures needed for welding repair while retaining the part's geometry.

Accordingly there is a need for an apparatus and method to protect impellers from welding damage that arises from high temperatures. It is desired that the apparatus be able to prevent excessive warping of the impeller shape. Further, it is desired that the apparatus, and method of using the apparatus, be suitable for use with automated welding systems. It is thus desired that the efficiency of automated welding systems not be unduly compromised by the protective apparatus and method. The present invention addresses one or more of these needs.

SUMMARY OF THE INVENTION

The present invention provides an apparatus and methods for use in automated welding repairs. In one embodiment, the invention provides an impeller weld restraining fixture. The fixture includes a base plate and top ring. An impeller may be sandwiched between the base plate and the top ring. Tangs located on the top ring may be fitted into the spaces between blades on a turbine impeller or blisk.

In one embodiment, and by way of example only, there is provided a fixture for use in weld repairing an impeller comprising: a base plate structured for restraining an impeller; and a top ring structured for restraining an impeller wherein the top ring may be attached to the base plate such that an impeller is firmly held between the base plate and top ring when the top ring is attached to the base plate. The base plate and top ring may be fabricated of nickel alloys such as AMS 5596. The base plate may include a surface for receiving the curvic face of an impeller, and the top ring may have a number of tangs that contact valley faces of the impeller. The number of tangs may or may not match the number of valley faces of the impeller. Further, the top ring and base plate may have a number of matching holes such that nuts and bolts that may be disposed through these matching holes so as to firmly hold the top ring and base plate together. The number of matching holes may or may not equal the number of valley faces of the impeller, and the nuts and bolts may be formed of a nickel-based Inconel alloy such as Inconel 718.

Other independent features and advantages of the impeller weld restraining fixture will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

It has now been discovered that welding repairs on gas turbine engine impellers can be improved through the use of a weld restraining fixture. As described further herein, an embodiment of a weld restraining fixture includes a base plate and top ring that may be affixed to the base plate so as to secure an impeller therebetween. In a preferred usage of the welding fixture, an impeller is secured to the fixture and remains there during welding steps including welding, heat treatment, and optionally, post-welding surfacing operations.

Figure 1:
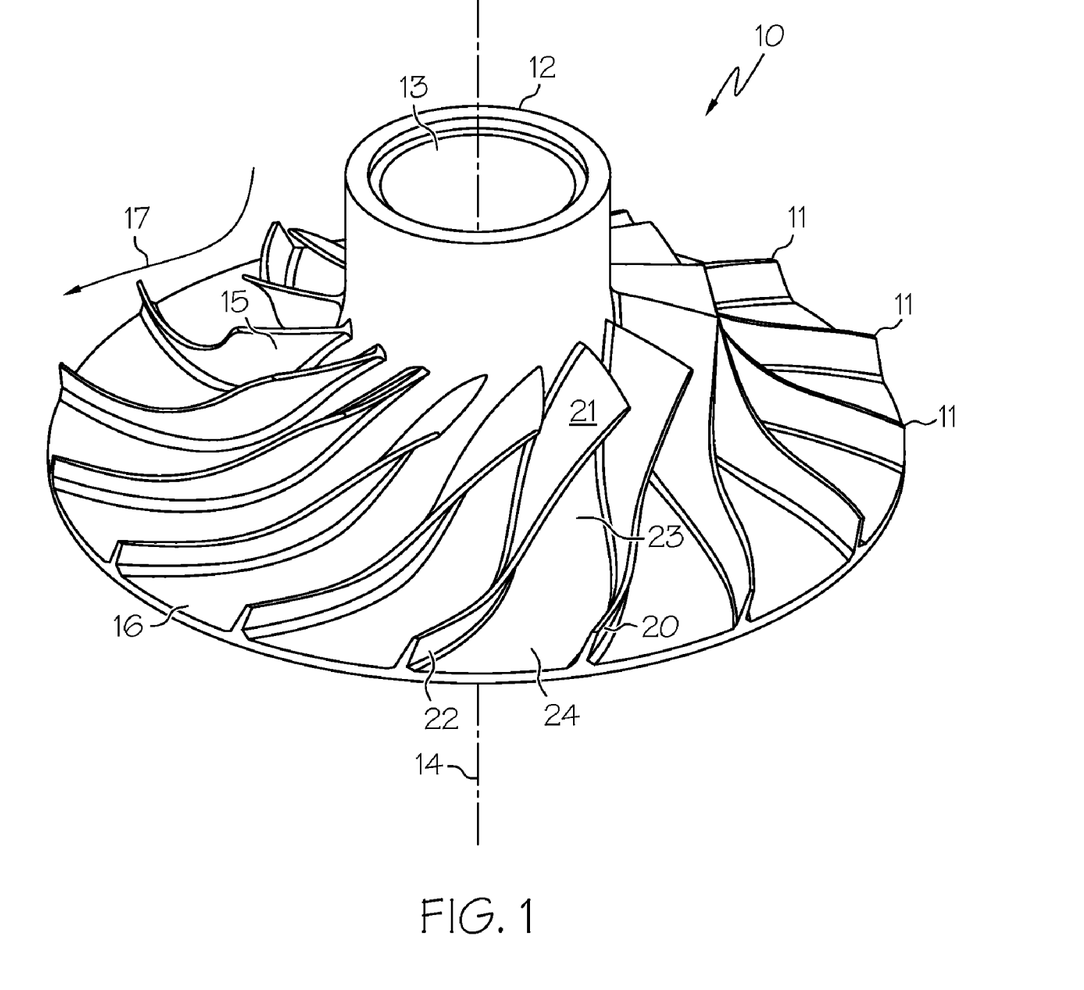
FIG. 1 is a perspective view of a gas turbine engine impeller such as may be used with the present invention.

Referring now to FIG. 1 there is shown a representation of a typical impeller suitable for use with the present invention. Impeller 10 includes a plurality of impeller airfoils 11 attached to a central core 12. Impeller 10 has a generally radial structure and, as shown in this figure, a central bore area 13. In some designs, impeller 10 is fabricated as a unitary piece with an axle and would not have an open bore area, though it would have the corresponding bore region. Central bore area 13 is aligned along an imaginary central axis 14 that runs through central bore area 13 in an axial direction. In operation, impeller 10 is disposed on a central axle (not shown) at central bore area 13 and rotates thereon or rotates with the axle. Impeller blades 11 extend from central bore area 13 in an outwardly radial and axial direction. Impeller 10 further defines an upstream position 15 and downstream position 16. Upstream position 15 and downstream position 16 correspond to the fluid path flow through and across impeller 10. Fluid, such as air, first enters impeller 10 at the upstream position 15 (inducer). As air passes impeller 10 it exits in the downstream position (exducer). Air passing across impeller 10 is pressurized such that the air exiting impeller 10 is at a higher temperature and pressure relative to the air entering impeller 10. The direction of air flow 17 is across the face of impeller 10, the face being that portion of impeller 10 which is exposed to air flow. In operation, impeller 10 is disposed within a housing or structure (not shown) which, by close proximity to impeller blades 11, assists in placing the air under pressure.

An individual airfoil 11 may further be described as defining a contour edge 20. Contour edge 20 is the generally ridge-like surface that extends in height from airfoil 11. Additionally each airfoil 11 defines a pressure face 21 and a suction face 22. Pressure face 21 is that face of airfoil 11 that spins into the air being compressed when an airfoil rotates. Suction face 22 is the opposite face of the airfoil 11. Neighboring airfoils define a valley 23 therebetween. It can also be stated that valley 23 is bounded by neighboring airfoils. As used in this specification, the term "valley" refers to the empty space, or volume, that is defined between two neighboring airfoils on an impeller or blisk. The valley face 24 is that portion of the impeller or blisk structure that lies between neighboring airfoils. Thus the valley face 24 forms a bottom boundary of a valley 23. Similarly a pressure face 21 of an airfoil forms a boundary of a valley, and a suction face 22 forms another boundary of a valley. By the open nature of the impeller/blisk structure, there is no upper boundary on a valley 23. Similarly, the valley is unbounded at the inducer and exducer positions.

Figure 2:
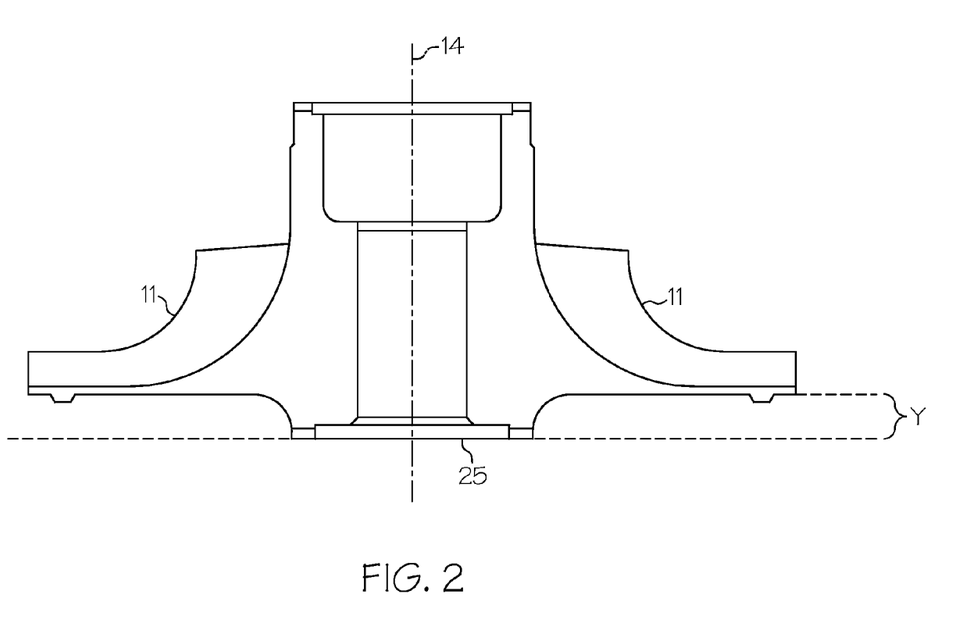
FIG. 2 is a cross-section of a gas turbine engine impeller as may be used with the present invention.

Referring now to FIG. 2 there is shown a cross section view of an impeller. This view also illustrates curvic face 25 of the impeller, which was hidden in FIG. 1. Curvic face 25 is included on many impeller designs. It is a projection that may include toothed or geared structures. Curvic face 25 is generally symmetrical about central axis 14. As explained further herein, curvic face 25 is involved in positioning impeller 10 on the restraining fixture.

Figure 3:
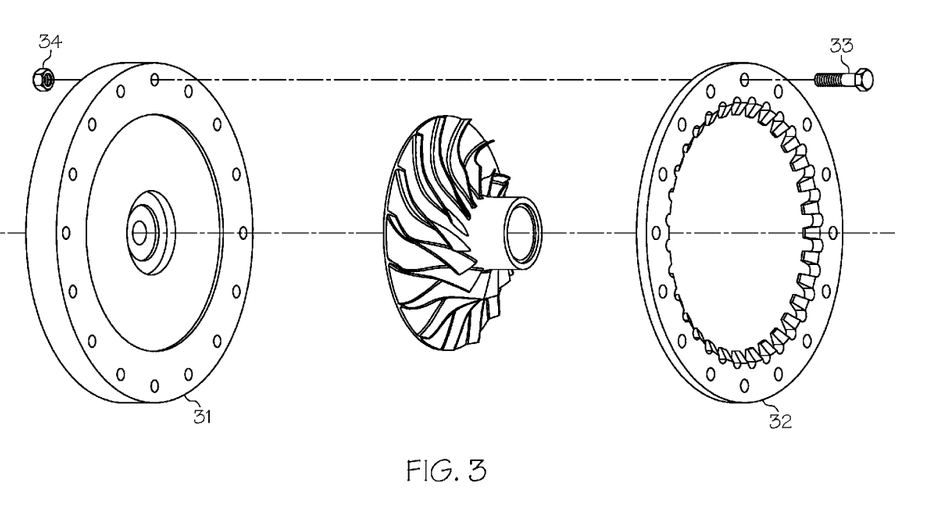
FIG. 3 is an exploded view of a weld restraining fixture according to an embodiment of the present invention.

Referring now to FIG. 3 there is shown an exploded view of a restraining fixture, according to an embodiment of the present invention. The restraining fixture in FIG. 3 also has an impeller positioned ready to be restrained in the fixture. The restraining fixture includes base plate 31 and top ring 32. Further illustrated in FIG. 3 are bolts 33 and nuts 34, representing one method of affixing top ring 32 to base plate 31. An exemplary impeller 35 is shown disposed between base plate 31 and top ring 32 where, for example, impeller 35 may be secured.

Figure 4:
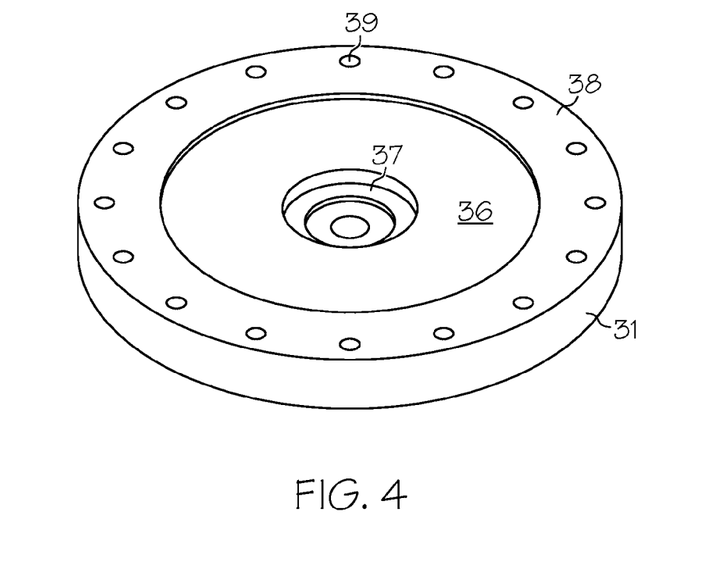
FIG. 4 is a perspective view of a base plate, according to an embodiment of the present invention.

Referring now to FIG. 4 there is shown a perspective view of an exemplary embodiment of base plate 31. Base plate 31 includes a first surface 36 and second surface 37. In a preferred embodiment, first surface 36 and second surface 37, which are concentric, are generally circular in shape. Base plate 31 further includes annular surface 38. Holes 39 in annular surface 38 extend through the thickness of base plate 31 and may be employed with nuts and bolts to fasten base plate 31 to top ring 32. Holes 39 are preferably aligned along the same radius relative to the center of base plate 31.

It is noted that base plate 31 is generally circular in its outer shape as shown in FIG. 4. This is a preferred shape for material savings and for ease of handling; however, it is noted that the outer shape of base plate 31 may assume other shapes or configurations.

Figure 5:
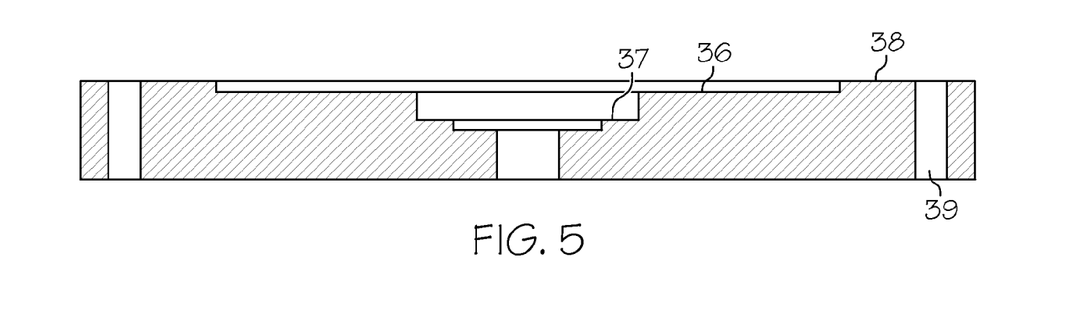
FIG. 5 is a cross section view of a base plate, according to an embodiment of the present invention.

FIG. 5 is another illustration of base plate 31. FIG. 5 provides a cross section view which illustrates, for example, the comparative depths of first surface 36 and second surface 37, according to one embodiment of the base plate 31. Thus, as is shown, second surface 37 is deeper than first surface 36, relative to annular surface 38.

Figure 6:
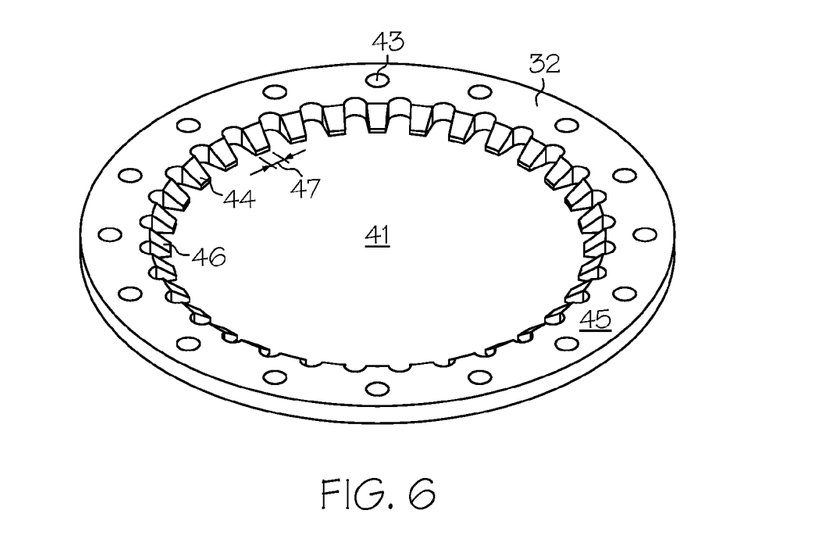
FIG. 6 is a perspective view of a retraining ring according to an embodiment of the present invention.

Referring now to FIG. 6 there is shown a perspective view of an exemplary embodiment of top ring 32. As shown, top ring 32 is a generally circular structure that defines a central opening 41. A central axis of top ring 32 may be defined within central opening 41. Again, the overall shape of top ring 32 is preferably circular in order to realize a material savings and to allow ease of handling, but other shapes are possible. Top ring 32 further includes top surface 45 and bottom surface 42 (shown in FIG. 7). Bottom surface 42 is preferably planar. Holes 43 are also present in top ring 32 in a preferred embodiment. Holes 43 of top ring 32 are designed to align with holes 39 in a corresponding base plate 31.

Figure 7:
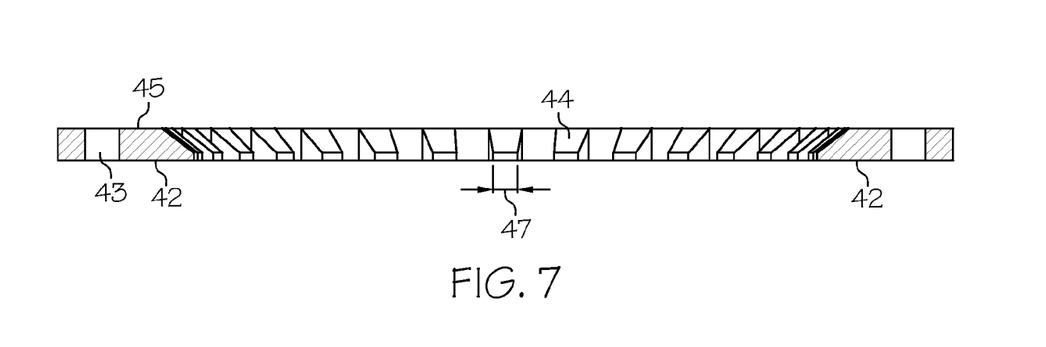
FIG. 7 is a cross section view of a retaining ring according to an embodiment of the present invention.

Still referring to FIG. 6, top ring 32 includes tangs 44. Tangs 44 project into central opening 41 toward the central axis of top ring 32. Tangs 44 extend radially inwardly from top ring 32. Tang 44 provides a structure by which material of top ring 32 is projected such that the bottom surface 42 of top ring 32 is further extended by tangs 44 into the area of the central opening 41. As will be further explained, this projection by tangs 44 allows top ring 32 to mate with valley face 24 of an impeller in order to secure the impeller to base plate 31. FIG. 7 provides a cross section view of top ring 32, and it illustrates many common features.

The shape of tangs 44 may vary. However, it is preferred to fabricate them substantially in the shape shown in FIG. 6. In this embodiment bottom surface 42 extends in planar relation along the tang structure. A projection surface 46 of tang 44 is formed by a surface extending from upper or top surface 45 of top ring 32 along the tang structure. As shown in FIG. 6 it is preferred that projection surface 46 is set at some angle different from the plane of upper surface 42. While projection surface 46 is shown in the preferred embodiment as substantially straight, other embodiments are also possible. Tangs 44 may be fabricated by cutting material away from top ring 32 during manufacturing. For example, radial or circular cuts may define the shape of tangs 44. One feature of tang 44 is its width 47. As is discussed further below, top ring 32 is positioned on an impeller so that tangs 44 rest on valley faces 24 of impeller. Thus, the width 47 of tang 44 should be selected to allow this positioning. Tang 44 should not interfere with airfoils 11 that neighbor a valley 23.

In a preferred embodiment, a top ring 32 includes a tang 44 for each valley 23 of an impeller with which that top ring 32 is to be used. However, in other embodiments, different numbers of tangs 44 may be provided. Similarly, in a preferred embodiment, top ring 32 and base plate 31 have corresponding holes 39, 43 that match the number of valleys 23 in the impeller to be secured. However, in other embodiments, the number of holes 39, 43 may be different than the number of valleys 23.

In a preferred embodiment, components of the weld restraining fixture are made of high-strength materials sufficient to withstand bending and shear forces that are generated in assembling the fixture. Preferably base plate 31 and top ring 32 comprise the same or similar metal alloy. In a preferred embodiment, base plate 31 and top ring 32 are fabricated of a nickel alloy known by SAE designation AMS 5596. An exemplary content of such an alloy is as follows, by weight percent.

| Element | min. | max. |
|---|---|---|
| Carbon | — | 0.08 |
| Manganese | — | 0.35 |
| Silicon | — | 0.35 |
| Phosphorus | — | 0.015 |
| Sulfur | — | 0.015 |
| Chromium | 17.00 | 21.00 |
| Nickel | 50.00 | 55.00 |
| Molybdenum | 2.80 | 3.30 |
| Columbium | 4.75 | 5.50 |
| Titanium | 0.65 | 1.15 |
| Aluminum | 0.20 | 0.80 |
| Cobalt | — | 1.00 |
| Tantalum | — | 0.05 |
| Boron | — | 0.006 |

-continued

| Element | min. | max. |
|---|---|---|
| Copper | — | 0.30 |
| Iron | remainder | |

In this kind of embodiment, the titanium material of a titanium-alloy impeller is softer than the nickel alloy that constitutes top ring 32 and base plate 31. Thus, the nickel alloy base plate 31 and top ring 32 are able to restrain the softer titanium-alloy impeller. When nuts and bolts are used as the means to secure base plate 31 and top ring 32, it is preferred that they be formed of Inconel type nickel alloys.

Having described the invention from a structural standpoint, a method and manner of using the invention will now be described.

Once an impeller is identified for repair, it is prepared for welding, or other kind, of repair. This may include procedures known in the industry such as grit blasting and degreasing. At this point, impeller 10 is ready to be secured in the restraining fixture. The restraining fixture is disassembled so as to receive impeller 10. It is also preferred that the components of the restraining fixture, such as base plate 31 and top ring 32 also be clean.

Figure 8:
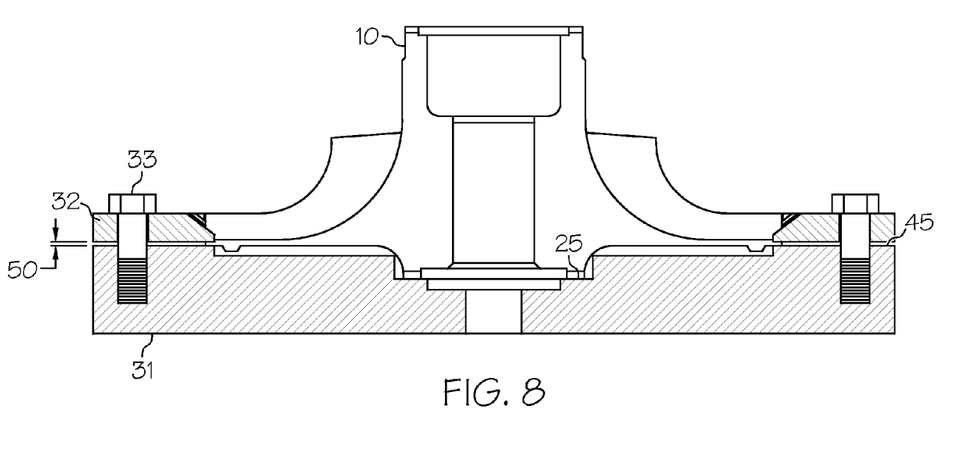
FIG. 8 is a cross section view of a restraining fixture assembled with an impeller, according to an embodiment of the present invention.

Impeller 10 is first positioned to rest on base plate 31. The assembly is such that it may be achieved by hand. This is done such that curvic face 25 rests on second surface 37 of base plate 31. Base plate 31 is sized so that, when impeller 10 rests on base plate 31, the outer radial edge of impeller 10 overlaps with annular surface 38 of base plate 31. This overlap can be seen in FIG. 8. FIG. 8 illustrates a cross section view of an impeller held in a restraining fixture. At this point, impeller 10 rests on its own weight on base plate 31. Depending on the design, impeller 10 may contact or may not contact annular surface 38 of base plate 31. In a preferred embodiment, impeller 10 does not contact annular surface 38 when impeller 10 only rests on base plate 31.

At this point, top ring 32 may be secured and affixed to base plate 31. Top ring 32 is positioned on impeller 10 so that tangs 44 rest on valley faces 24 of impeller 10. It is preferred that tangs 44 be centered within each valley face 24. Additionally, top ring 32, and impeller 10, may be rotated in order to align holes 43 of top ring 32 with holes 39 in base plate 31. Bolts 33 may be disposed within holes 43, 39 and secured to nuts 34. Both top ring 32 and base plate 31 are configured to engage a particular impeller design.

It is desired to secure impeller 10 between base plate 31 and top ring 32. This is achieved by torqueing bolts 33 and nuts 34. The degree of torqueing accordingly plays a role in securing the impeller. It is thus preferred that the torqueing be to a minimum of 30 foot-pounds (ft-lbs).

As a result, when the impeller is loaded into the fixture and the fixture is torqued to a desired amount, it is the impeller that does the majority of the bending, rather than the fixture doing the bending. Referring now to FIG. 8, there is shown an assembled restraining fixture. In this illustration, top ring 32 has been fully assembled to base plate 31, and impeller is thereby restrained. It is noted that, at this point in the assembly process, impeller 10 is in contact with both base plate 31 at annular surface 38 and top ring 32 at bottom surface 42 of tangs 44. Additionally, there is a gap 50 between top ring 32 and base plate 31. In this embodiment, fully torqueing top ring 32 to base plate 31 does not result in those pieces contacting each other.

The preferred embodiment of the restraining fixture has described bolts 33 and nuts 34 as the means by which to firmly affix top ring 32 and base plate 31. Other mechanisms may be used to achieve this coupling, including, for example clamps.

Once the impeller 10 is restrained by the top ring 32 and base plate 31, the impeller may be repaired. One such repair includes welding and resurfacing of airfoil edges. It is preferred that the impeller 10 remain in the restraining fixture during welding operation and post welding heat treatment operations. Additionally, it is preferred to keep the impeller positioned in the restraining fixture during any grinding or finishing operations.

Figure 9:
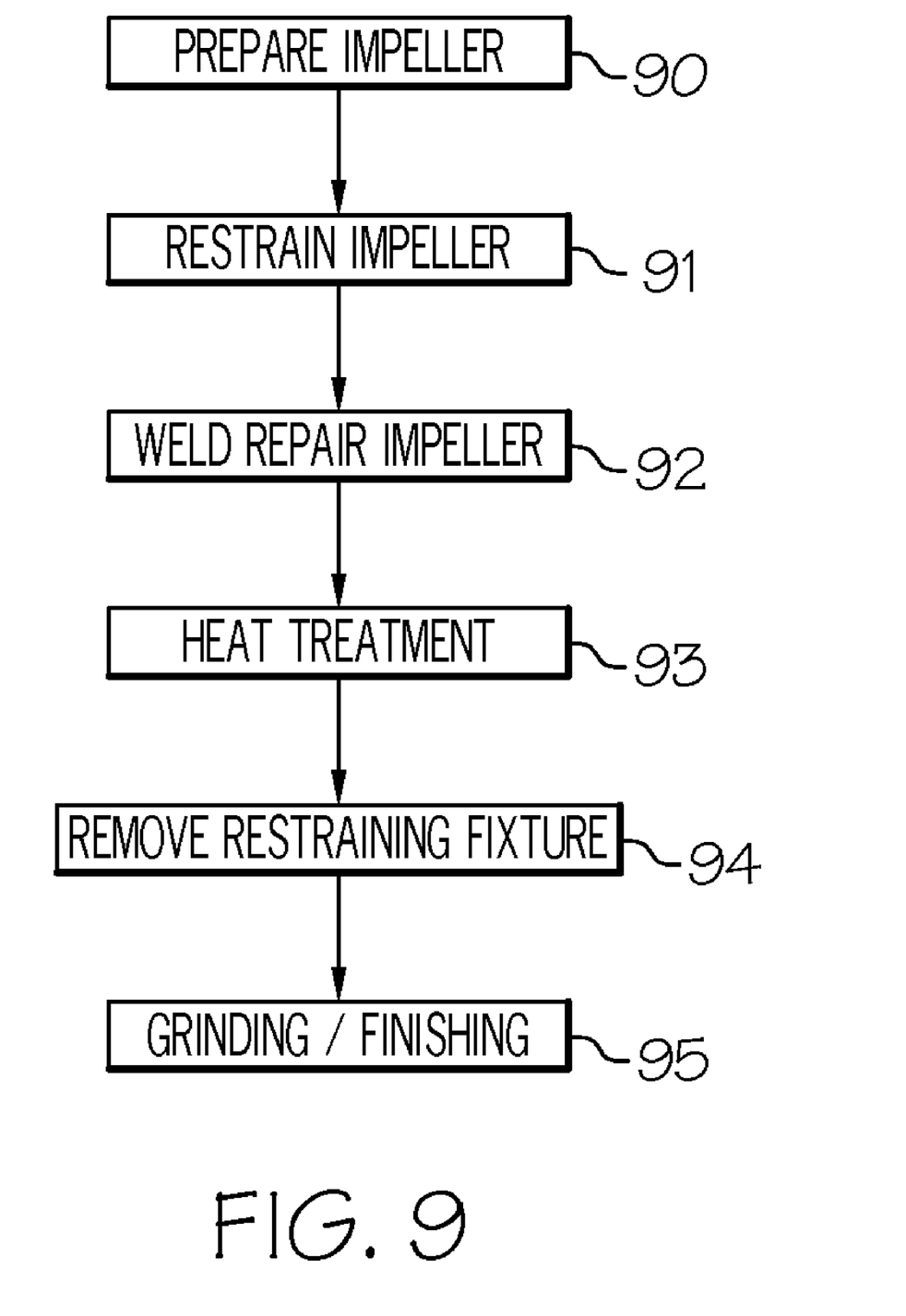
FIG. 9 is a flow chart showing steps in an impeller repair process that uses the restraining fixture, according to an embodiment of the present invention.

Thus, one embodiment of a welding operation to repair an impeller edge surface includes the following steps, illustrated in FIG. 9. In step 90 an impeller is prepared for welding. This may include degreasing and grit blasting the impeller. The preparation step may also include selection and inspection of the impeller such that impellers that cannot be weld repaired are identified and removed.

In step 91 the impeller is placed in the restraining fixture. In this step the impeller is placed onto base plate 31. The top ring 32 is then positioned onto the impeller and connected to base place 32. Top ring 32 and base plate 31 are then connected to a desired force such that the impeller is firmly held in the restraining fixture.

At this point, step 92, the impeller may receive a weld repair. This includes, among other operations a surface or edge restoration. A typical weld repair includes TIG welding of an airfoil edge. Following this, the impeller may be subject to a heat treatment, step 93.

At this point, step 94, the impeller may be removed from the restraining fixture. This includes unbolting top ring 32 and base plate 31. The impeller is then removed from those pieces.

Following the heat treatment, the impeller may receive a finishing or grinding, step 95. Finishing and grinding step 95 restores airfoil surfaces to a final geometry. The impeller may then be inspected and returned to service.

Repairs made to impellers with the weld restraining fixture have resulted in impellers having an improved finished geometry. One improvement that is noted in those impellers restrained by embodiments of the restraining fixture relates to variance in radial warp of the impeller. Impellers can be characterized by a dimension "Y" shown in FIG. 2. Dimension Y denotes the distance between a point on the outer radial edge of the impeller, and a plane extending from curvic face 25. In prior art repairs, it has been observed that a "potato chip" effect occurs. That is dimension Y differs at various radial points of the impeller. In particular, points at an impeller valley may have different Y dimensions compared to those points measured at the airfoil. Thus, there is a wave, or potato chip, look to those impellers. This effect is undesirable because an overly large variance in Y dimension can disqualify an impeller from return to service. Exemplary weld repairs have been achieved where the Y dimension variance is approximately 0.001 to 0.002 inches. This is contrasted with repairs performed without the restraining fixture having a variance of approximately 0.010 inches. Hence, repairs with the weld restraining fixture have achieved approximately an order of magnitude improvement.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for repairing an impeller comprising the steps of:
    positioning the impeller on a base plate such that a curvic face of the impeller rests on a surface of the base plate;
    positioning a top ring around the impeller such that a plurality of tangs that extend radially inwardly from an inner peripheral surface of the top ring rest on a plurality of valley faces of the impeller; and
    securing the top ring to the base plate to thereby restrain the impeller therebetween.

2. The method according to claim 1, further comprising the steps of:
    weld repairing the restrained impeller;
    heat treating the restrained impeller;
    releasing the impeller from the top ring and the base plate; and
    finishing the impeller.

3. The method according to claim 2, further comprising the step of preparing the impeller for welding.

4. The method according to claim 2, wherein the step of weld repairing the restrained impeller comprises weld repairing an airfoil edge.

5. The method according to claim 1, wherein the step of securing the top ring to the base plate comprises bolting the top ring to the base plate.

6. The method according to claim 5, wherein the step of securing the top ring to the base plate results in a gap between the top ring and the base plate.

7. The method according to claim 5, further comprising bolting the top ring to the base plate at a torque of at least 35 ft-lbs.

8. The method according to claim 5, wherein the step of securing the top ring to the base plate comprises clamping the top ring to the base plate.

* * * * *